3,136,646
STABILIZED CATIONIC STARCH COMPOSITION

Lee H. Elizer, Glen C. Glasscock, and John M. Seitz, Keokuk, Iowa, assignors to The Hubinger Company, Keokuk, Iowa, a corporation of Iowa
No Drawing. Filed Dec. 19, 1960, Ser. No. 76,455
18 Claims. (Cl. 106—210)

This invention relates to a stabilized cationic-starch composition and to a method of preparation thereof. It is more particularly concerned with a process for treating cationic starch compositions of a special type in order to impart thereto improved fluidity and stability and to prevent or retard polymerization.

The special type of cationic starch composition with which the invention is concerned is one obtained by the reaction of a starch or starch conversion product, i.e., starch or a starch which has been converted by heat, acid or enzymatic action, with a substance from the group consisting of cyanamide, the alkali metal salts of cyanamide and the alkaline earth metal salts of cyanamide in an aqueous dispersion. All of the foregoing substances are herein referred to as cationic cyanamide-starch reaction products and may be given the general formula (1) 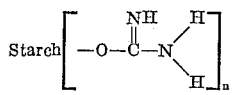

where $n$ represents a positive value corresponding to the extent to which the hydroxyl groups of the starch molecule have been reacted.

The invention is also applicable to the salts of the foregoing cationic cyanamide-starch products formed by the addition of an acid, as, for example, hydrochloric acid, sulfuric acid, nitric acid, acetic acid, propionic acid, and the like. Such salts may be given various formulae. Thus, the product obtained by treating the product of Formula 1 with hydrochloric acid can be given the formula (2) 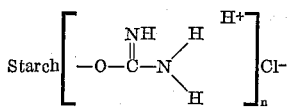

where $n$ has the same significance as in Formula 1. The exact positions of the hydrogen atom and the chlorine atom are not shown in the formula but presumably both the hydrogen and chlorine would attach to the primary amino group.

The invention is likewise applicable to the salts obtained by reacting an ionizable organic compound AX (where A is a hydrocarbon radical and X is the negative radical of an acid) with the cationic cyanamide-starch product of Formula 1, including, for example, the reaction products obtained where the organic halide is methyl chloride, ethyl chloride, methyl bromide, ethyl bromide, dimethyl sulfate, cyclohexyl chloride, benzyl chloride, and the like. The product of the reaction of the composition of Formula 1 and an organic halide such as ethyl chloride can be given the formula (3) 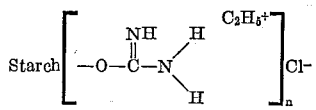

where $n$ has the same significance as in Formula 1.

The compositions heretofore described are herein referred to collectively as cationic cyanamide-starch reaction products and salts thereof. These compositions as such do not form a part of this invention but have been or will be claimed as separate inventions in other patent applications.

One problem which has been encountered in the use of the foregoing compositions is the viscosity control of their aqueous dispersions. Aqueous dispersions of these products, some of them more than others, thicken on standing, thereby impairing their utility. This is believed to be caused by polymerization.

One of the objects of the present invention is to provide a new and improved method of treating these compositions in order to control the viscosities of their aqueous dispersions.

Another object is to provide new and useful products which are especially valuable in the textile industry as well as in other industries. Other objects will appear hereinafter.

In accordance with the invention it has been found that aluminum sulfate, when added to a cationic cyanamide-starch or salt thereof, reduces the tendency of such starch product to thicken in aqueous dispersions. In practicing the invention it is preferable to use a form of aluminum sulfate which is commercially available and which is a hydrated aluminum sulfate commonly referred to as alum. While the water of hydration may vary somewhat, for the purpose of description the term "alum" as used herein is intended to mean $$Al_2(SO_4)_3 \cdot 18H_2O$$

The quantity of alum which is effective for the purpose of the invention is subject to variation but it should be enough to reduce the tendency of aqueous dispersions of the cationic cyanamide-starch product to thicken. Good results in controlling viscosity have been obtained by employing approximately 0.2% by weight of alum based on the dry weight of the cationic cyanamide-starch product or salt thereof. A significant effect is obtained with as little as 0.05% by weight of alum, based on the dry weight of the product. It is possible, of course, to use larger amounts but in general it is not necessary to use more than 3% by weight of alum.

Another substance which has the ability to control viscosity of such aqueous dispersions is an alkali metal acid pyrophosphate, such as, for example, sodium acid pyrophosphate, and this may be employed either alone or in conjunction with aluminum sulfate. One combination which has proven especially useful, for example, comprises 0.7% by weight of alum and 0.2% of sodium acid pyrophosphate based on the weight of the cationic cyanamide-starch product or salt thereof.

The best mode contemplated for the practice of the invention is the preparation of a cationic cyanamide-starch product containing alum for use in the textile industry. This product is especially useful for sizing threads made of wool or wool-Dacron blends prior to weaving and which are ordinarily rather difficult to size.

The invention will be further illustrated but is not limited by the following examples in which the quantities are stated in parts by weight unless otherwise indicated.

Example 1

A thin boiling starch mixture is prepared by mixing 30,000 pounds of waxy corn starch and 30,000 pounds of regular corn starch with water to about 19° Bé. to form a slurry, then adding 196 gallons of hydrochloric acid, 20.3° Bé. until the resultant thin boiling starch has an alkaline tip fluidity of 16.5 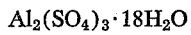 1,000 pounds of soda ash is added to neutralize to a pH of about 4.2 and the temperature is adjusted to 95° F.

In another tank, 1600 pounds of commercial calcium cyanamide are dispersed in 1250 gallons of water at 94° F. for a period of 40 minutes, the resultant slurry is filtered, and the filtrate is added to the starch slurry.

Then a second batch of 1400 pounds of calcium cyanamide dispersed in 1250 gallons of water at 94° F. for 40 minutes is prepared, filtered, and the filtrate is added to the starch slurry.

The filtrate from the 3000 pounds of calcium cyanamide is mixed with the thin boiling starch mixture for 16 hours at 95° F. During this period the pH is on the alkaline side (about 10.2–10.9) due to the fact that the calcium cyanamide is alkaline when dispersed in water. 420 gallons of 0.1 N hydrochloric acid is added and the product is mixed therewith for 1 hour (pH about 2.0). The pH is then adjusted to 3.5 by adding soda ash and the product is filtered on a string filter and washed. The filtered product is then reslurried with 1200 pounds of alum dissolved in 900 gallons of water at 110° F. at a pH of about 3.6. The resultant product is dried on conveyor dryers for 10 hours. To the dry product there is added, by dry blending, 0.1% by weight of a defoaming agent, Pluronics L–61, which is an oxyethylated polyoxypropylene glycol, and 1% of alum based on the dry weight of the product.

Samples of the product before the final blending step are taken from two separate dryers and tested for nitrogen, ash, moisture, and viscosity. The following results are obtained:

|  | Moisture, percent | Nitrogen, percent dry basis | Ash, percent dry basis | Brookfield viscosity, centipoises | | | |
|---|---|---|---|---|---|---|---|
|  |  |  |  | 10 r.p.m. | 20 r.p.m. | 50 r.p.m. | 100 r.p.m. |
| No. 1 dryer after 1 hour | 10.5 | 0.31 | 0.24 | 4,600 | 3,200 | 2,080 | 1,380 |
| No. 2 dryer after 1 hour | 12.6 | 0.32 | 0.25 | 6,100 | 3,850 | 2,240 | 1,520 |
| No. 1 dryer after 3 hours | 8.8 | 0.32 | 0.41 | 1,300 | 940 | 640 | 465 |
| No. 2 dryer after 3 hours | 15.8 | 0.32 | 0.33 | 2,500 | 1,640 | 1,060 | 710 |
| No. 1 dryer after 6 hours | 7.0 | 0.31 | 0.30 | 3,800 | 2,500 | 1,600 | 1,160 |
| No. 2 dryer after 6 hours | 15.3 | 0.32 | 0.29 | 2,300 | 1,600 | 1,000 | 730 |
| No. 1 dryer after 10 hours | 6.9 | 0.32 | 0.27 | 2,800 | 1,940 | 1,080 | 740 |
| No. 2 dryer after 10 hours | 12.6 | 0.32 | 0.27 | 3,300 | 2,200 | 1,340 | 940 |

The nitrogen content even after 10 hours in the slurry in the presence of alum at 3.5–4.0 pH did not change.

A composite product, after the dry blending step, has the following analysis: Moisture 10.8%; 0.32% nitrogen, dry basis; 0.53% ash, dry basis.

|  | NCV secs. | Brookfield viscosity, centipoises | | | |
|---|---|---|---|---|---|
|  |  | 10 r.p.m. | 20 r.p.m. | 50 r.p.m. | 100 r.p.m. |
| NCV (1–8) 75 grams in 600 mls. water cooked 35 minutes on boiling water bath | 34.0 | 400 | 240 | 220 | 200 |
| Cooked 70 minutes on boiling water bath | 8.0 | 20 | 20 | 32 | 42 | pH slurry 3.4.   pH paste 3.4.

The compositions prepared as above described are especially useful in sizing wool threads and wool-Dacron threads prior to weaving at concentrations of 1 to 2 pounds per gallon of water. Good weaving is obtained by the addition of 15% by weight of this product to the fiber as contrasted with a 23% by weight addition previously required with waxy corn starch as such.

In the foregoing example, the quantity of calcium cyanamide used is about 5% by weight of the dry substance starch. More fluid aqueous dispersions are obtained by using 10% by weight of calcium cyanamide (CaNCN). The use of the waxy corn starch is optional but desirable in eliminating gel formation in the cooked pastes at the 5% level of treatment with CaNCN.

Example II 10 pounds of pearl corn starch are slurried in 5 liters of water and 45 mls. of concentrated hydrochloric acid are added to a pH of 1.2. The temperature of the mixture is adjusted to 125° F. and heating is carried out until a product having an alkaline tip fluidity of 17 is obtained. The pH of the mixture is then adjusted to 5.0 by adding soda ash and the temperature is maintained at 95° F. 100 grams of the product is removed, filtered, washed, dried, and labeled Product A.

A slurry is prepared by mixing 400 grams of calcium cyanamide in 5 liters of water for 30 minutes at 95° F. The mixture is filtered, washed, and the filter cake reslurried with 500 mls. of water at 95° F. The combined filtrates are mixed with the previously prepared thin boiling starch and the mixture is heated for 16 hours at 95° F. During this period the pH is about 10.7. Hydrochloric acid is then added in sufficient amount to reduce the pH to 2.0 and after another hour the product is filtered, washed, and reslurried in water to 15.5° Bé. gravity. 45 grams of alum in 100 mls. of water are added to the slurry. After one hour the resultant product is filtered, dried to 10% moisture, and labeled Product B.

A sample of Product B contains approximately 91.58% solids and on a dry basis has an ash content of 0.092% and a nitrogen content of 0.687%.

NCV viscosity tests made on dispersions of the foregoing products consisting of 75 grams of each product dispersed in 600 grams of water (NCV 1–8) and heated on a boiling steam bath for 35 minutes and 70 minutes shows that Product A, which has not been treated with filtrate from calcium cyanamide, has a viscosity of 26.5 seconds on the 35 minute sample, and 27.0 seconds on the 70 minute sample. Product B has a viscosity of 17.5 seconds on the 35 minute sample and 51 seconds on the 70 minute sample. The pH of Product A in a slurry is 5.4 and in a paste is 5.7. The pH of Product B in a slurry is 3.8 and in a paste 3.9. Product B was treated with alum but not quite enough remained in the product to keep it from thickening on cooling.

To demonstrate the viscosity controlling effect of alum, 1% by weight of alum is blended dry with Product B to produce a Product C. This results in reducing the 35 minute viscosity (NCV) to 10 seconds and the 70 minute viscosity to 8 seconds.

Adding 0.5% by weight of borax to Product C gives a product B having an NCV (1–8) viscosity of 15 seconds for the 35 minute sample and 16 seconds for the 70 minute sample. Thus, the addition of borax can be used to increase the viscosity of the aqueous dispersions of these products where the original viscosity reduction by the addition of alum has been more than desired. Product D has a pH of 4.6 and forms a fluid cold paste.

The addition of 1% by weight of borax by dry blending with Product C to produce a Product E gives a product having an NCV (1–8) viscosity of 20.5 seconds in the 35 minute sample and 14.5 seconds in the 70 minute sample. The pH of the paste is 4.1 and the cold paste of this product is fluid.

When 1.25% by weight of borax is blended with Product C the viscosity increasing effect of the borax is more noticeable and the cold paste of the resultant product does not remain fluid.

*Example III*

This example illustrates the highly selective action of aluminum sulfate as compared with other chemicals which were used in an effort to control the viscosity of aqueous dispersions of cyanamide-starch products.

100 pounds of regular corn starch are slurried in 13 gallons of water and 250 mls. of concentrated hydrochloric acid are added to give a pH of 1.7. The temperature of the slurry is adjusted to 123° F. and the slurry is heated until a thin boiling starch having an alkaline tip fluidity of 17.5 is obtained. The pH is then adjusted to 5.0 by adding sodium carbonate and the temperature is reduced to 80° F.

A calcium cyanamide solution is prepared by slurrying 4.5 pounds of CaNCN in 15 gallons of water for 30 minutes at 78° F., then filtering and washing the filter cake with 5 gallons of water. The filtrate has a pH of about 10.9.

This filtrate is then added to the thin boiling starch prepared as previously described and the mixture is stirred at 78° F. for 16 hours. The pH is then adjusted to 4.0 by adding hydrochloric acid. After one hour the mixture is filtered, washed and reslurried with water to 15.5° Bé. The pH is then adjusted to 4.5 and the product is filtered and dried to 10% moisture. This product is labeled A4–5.

5 pounds of the product A4–5 is mixed with 20 grams of alum dissolved in 50 mls. of water, the mixing being effected in sufficient water to form a slurry which is filtered after one hour and the solids are dried to 10% moisture. This product, to which approximately 1% by weight of alum on a dry basis has been added, is labeled B4–5.

The following additional products are prepared in the same manner as Product B4–5 except that 20 grams of another ingredient is substituted for the alum. The resultant products are labeled as follows:

| Label: | Ingredient used in place of alum |
|---|---|
| C4–5 | Zinc sulfate. |
| D4–5 | Copper sulfate. |
| E4–5 | Sodium chloride. |
| F4–5 | Magnesium sulfate. |
| G4–5 | Borax. |
| H4–5 | Ammonium chloride. |
| I4–5 | Monosodium phosphate. |
| J4–5 | Sodium bisulfite. |
| K4–5 | Sodium sulfite. |
| L4–5 | Calcium chloride. |
| M4–5 | Sodium sulfate. |
| N4–5 | Boric acid. |
| O4–5 | Monopotassium phosphate. |
| P4–5 | Urea. |
| Q4–5 | Sodium acid pyrophosphate. |
| R4–5 | Sodium polyphosphate. |
| S4–5 | Acetamide. |
| T4–5 | Succinonitrile. |
| U4–5 | Sodium propionate. |

Each of the foregoing products is analyzed and given NCV viscosity tests by dispersing 75 grams of each product in 600 grams of water (NCV1–8) and heating on a boiling water bath for 35 minutes and 70 minutes, respectively, after which the viscosity is measured in seconds in an NCV pipette. The products B4–5 (alum plus cationic cyanamide-starch) and Q4–5 (sodium acid pyrophosphate plus cationic cyanamide-starch) are the only ones in which a reading can be obtained on the NCV pipette. The reading in the case of the B4–5 is 10.5 seconds for the 35 minute sample and 9.5 seconds for the 70 minute sample. In the case of the Q4–5 product, the reading is 13 seconds for the 35 minute sample and 10.5 seconds for the 70 minute sample. The other products thicken or polymerize.

*Example IV*

This example illustrates the preparation of a cationic cyanamide-starch product made by first reacting calcium cyanamide with starch and then adding an alkyl halide. 100 grams of CaNCN is slurried in 1000 mls. of water for 30 minutes at 78° F., then filtered, washed, and the filtrate is added to 1000 grams of corn starch diluted with water to 18° Bé. The mixture is maintained at a temperature of 76° F. for 16 hours. The resultant slurry is then divided into 2 portions A and B.

To portion A is added 50 grams of ethyl chloride at a temperature of 74° F. The resultant product is filtered, washed, and dried to 10% moisture.

Portion B is filtered, washed, reslurried in water sufficient to give a specific gravity of 18° Bé. and 50 grams of ethyl chloride is added at 74° F. The reaction is continued for 4 hours during which the pH is 11.7. The product is filtered, washed, and dried to 10% moisture.

Product A contains about 87.36% by weight dry solids. Product B contains 87.41% by weight dry solids. Product A contains 2.61% by weight ash on a dry basis and Product B contains 2.19% by weight ash on a dry basis. Product A contains 0.614% by weight nitrogen on a dry basis, and Product B contains 0.555% by weight nitrogen on a dry basis. Both products have a positive electrical charge. Product A has a substantivity of 1.5 and Product B has a substantivity of 3.0.

The viscosity of aqueous dispersions of these products is controlled by the addition of alum and/or sodium acid pyrophosphate thereto in quantities similar to those used for controlling the viscosities of the previously described products and preferably within the range of 0.2 to 1% by weight of alum and/or sodium acid pyrophosphate based on the dry weight of the products.

In the foregoing description, the alkaline tip fluidity, which is usually referred to as "tip" is determined by a standard procedure wherein a standard funnel is used with a tip calibrated to deliver 100 mls. of 125 mls. of distilled water at 60° F. in 60 seconds. In making the alkaline tip fluidity determination 5 grams of starch are wet with 10 mls. of distilled water in a 250 mls. beaker, 90 mls. of a 1% solution of NaOH are added, with stirring, and the stirring is continued at approximately 120 revolutions per minute (r.p.m.) for exactly 3 minutes. The solution is then allowed to stand in quiescence in an ice bath for exactly 27 minutes. At this time the solution is removed from the bath, adjusted to 59° F. and poured into the standard funnel. The amount of solution in mls. which flows from the funnel in exactly 60 seconds is measured and this figure is expressed as alkaline tip fluidity.

The NCV pipette method of measuring the hot paste viscosity is a standard method in which the apparatus consists of a three-stage electric heater, a stainless steel viscosimeter water bath and cup, an NCV pipette calibrated to deliver 50 mls. of water at 18° C. in 5.1 seconds, and stainless steel shafted propellers. The viscosity determinations can be made at various concentrations but in the foregoing examples a 1:8 ratio of starch to water is used and specifically 75 grams of starch in 600 mls. of water. The starch slurry is mixed at room temperature in the viscosimeter cup out of the water bath. At the same time, the water bath is brought to a rolling boil. At the end of 10 minutes mixing time the cup containing the starch slurry is transferred to the water bath. The stirrer is put in place through a cover lid with the blade revolving at 350 r.p.m. at about ½ inch from the bottom of the cup and the cooking process is timed. In the foregoing examples times of 35 minutes and 70 minutes are used. At the end of the predetermined time a pipette full of the cooked product is drawn off and allowed to drain in a waste beaker to bring the pipette up to temperature. Immediately another pipette full of the cook is drawn off and the time required for a flow of 50 mls. is measured by a stop watch. An average of two time readings is taken as the NCV figure.

It will be understood that the invention is not limited to the specific examples previously given. The alkaline tip fluidity is subject to wide variation. In general, an alkaline tip fluidity of 15 to 90 is preferred.

The amount of cyanamide added to the starch should be sufficient to produce a positive charge as measured in an electrolytic cell having platinum electrodes at a direct current voltage of 60 volts. If a dispersion of the product placed in such a cell is cationic it flocs to the negative pole. The product should also have a positive substantivity to cellulose. This is tested by determining the number of mls. of an 0.5% by weight cyanamide-starch product solution retained completely by 100 mls. of a 1% by weight dispersion of Solkafloc fibers after 5 minutes of stirring. Solkafloc fibers are a highly purified cellulose having a slight negative charge. If a product is cationic it will be adsorbed by these fibers. All of the products in the foregoing examples are both cationic and substantive to cellulose, with or without the addition of the alum and/or pyrophosphate. The substantivity is usually at least 1.5.

While the invention is especially useful in compositions made from corn starch, it will be understood that it is applicable to other types of starches, including, oat, rye, barley, potato, cassava, wheat, and the like. It is especially useful in reducing the initial viscosity and improving the fluid stability of converted starches which are obtained by treatment with an acid, chlorine, oxidation or enzyme action and reacted with a substance from the group consisting of cyanamide, alkali metal salts of cyanamide, and alkaline earth metal salts of cyanamide at a pH of at least 1, and the salts of such substances.

For convenience, the quantity of the alum and/or pyrophosphate which is effective to control the viscosity is referred to herein as a "fluid stabilizing amount."

The products provided in accordance with the invention are especially useful in the textile and paper industry. As previously indicated, they find an important use in the sizing of textile fibers prior to weaving and particularly in sizing those fibers, such as wool or wool-polyester blends which are difficult to size. The products are also useful in textile finishing. Additionally, they can be employed as sizing compositions in the paper industry where they can be added to the beater, stock chest, head box, or other place during the course of paper manufacture and can also be used as tub sizes.

The employment of aluminum sulfate and/or sodium acid pyrophosphate is especially useful where the products to which they are added normally tend to gel when dispersed in plain water. However, the addition of these substances is also desirable in some cases in order to adjust the viscosity and provide a more workable product.

The invention is hereby claimed as follows:

1. A composition comprising a substance from the group consisting of cationic cyanamide-starch reaction products and salts thereof and a fluid stabilizing amount of a substance from the group consisting of aluminum sulfate, sodium acid pyrophosphate and mixtures thereof.

2. A composition comprising a substance from the group consisting of cationic cyanamide-starch reaction products and salts thereof and 0.05% to 3% by weight of a substance from the group consisting of aluminum sulfate, sodium acid pyrophosphate and mixtures thereof.

3. A composition comprising a substance from the group consisting of cationic cyanamide-starch reaction products and salts thereof and about 1% by weight of a substance from the group consisting of aluminum sulfate, sodium acid pyrophosphate and mixtures thereof.

4. A composition comprising a substance from the group consisting of cationic cyanamide-starch reaction products and salts thereof and about 0.2 to 1% by weight of alum.

5. A composition comprising a thin boiling corn starch having an alkaline tip fluidity from 15 to 90 reacted with a substance from the group consisting of cyanamide, alkali metal salts of cyanamide and alkaline earth metal salts of cyanamide under conditions forming a cationic cyanamide-starch conversion product and a sufficient amount of alum uniformly distributed therethrough to reduce the viscosity of aqueous dispersions thereof.

6. A composition comprising a thin boiling corn starch having an alkaline tip fluidity from 15 to 90 reacted with a substance from the group consisting of cyanamide, alkali metal salts of cyanamide and alkaline earth metal salts of cyanamide, under conditions forming a cationic cyanamide-starch conversion product, and 0.2 to 1% by weight on a dry basis of the cyanamide-starch conversion product of alum uniformly distributed therethrough to reduce the viscosity of aqueous dispersions thereof.

7. A composition comprising a thin boiling corn starch having an alkaline tip fluidity from 15 to 90 reacted with a substance from the group consisting of cyanamide, alkali metal salts of cyanamide and alkaline earth metal salts of cyanamide, under conditions forming a cationic cyanamide-starch conversion product, and a sufficient amount of both alum and sodium acid pyrophosphate uniformly distributed therethrough to reduce the viscosity of aqueous dispersions thereof.

8. A composition comprising a thin boiling corn starch having an alkaline tip fluidity from 15 to 90 reacted with a substance from the group consisting of cyanamide, alkali metal salts of cyanamide and alkaline earth metal salts of cyanamide, under conditions forming a cationic cyanamide-starch conversion product, and both alum and sodium acid pyrophosphate uniformly distributed therethrough, the quantity of alum being about 0.7% by weight and the quantity of sodium acid pyrophosphate being about 0.2% by weight of the cyanamide-starch conversion product.

9. A composition comprising a thin boiling combination of both waxy corn starch and regular corn starch having an alkaline tip fluidity from 15 to 90 reacted with a substance from the group consisting of cyanamide, alkali metal salts of cyanamide, and alkaline earth metal salts of cyanamide under conditions forming a cationic cyanamide-starch conversion product, and salts of such starch conversion product, and a sufficient amount of a substance from the group consisting of aluminum sulfate, sodium acid pyrophosphate and mixtures thereof uniformly distributed therethrough to reduce the viscosity of aqueous dispersions thereof.

10. A process of preparing cationic cyanamide-starch reaction products and salts of such products having controlled viscosity characteristics which comprises adding a fluid stabilizing amount of a substance from the group consisting of aluminum sulfate, sodium acid pyrophosphate and mixtures thereof to an aqueous dispersion of such products before such products have been dried.

11. A process as claimed in claim 10 in which such products are dried and said substances thereafter blended with the dried products.

12. A process of sizing textile fibers which comprises sizing such fibers with an aqueous dispersion of a composition as claimed in claim 1.

13. Textile fibers containing a composition as claimed in claim 1.

14. A process of sizing textile fibers which comprises sizing such fibers with an aqueous dispersion of a composition as claimed in claim 5.

15. Textile fibers containing a composition as claimed in claim 5.

16. A process of sizing textile fibers from the class consisting of wool and wool-polyester blends which comprises sizing such fibers with an aqueous dispersion of a composition as claimed in claim 5.

17. Textile fibers from the class consisting of wool and wool-polyester blends containing a composition as claimed in claim 5.

18. Cellulose fibers containing a composition as claimed in claim 1.

References Cited in the file of this patent
UNITED STATES PATENTS

| | | |
|---|---|---|
| 2,291,041 | Kauffmann et al. | July 28, 1942 |
| 2,566,861 | Studeny | Sept. 4, 1951 |
| 2,894,944 | Paschall | July 14, 1959 |